(12) United States Patent
Wilson et al.

(10) Patent No.: US 12,299,581 B1
(45) Date of Patent: May 13, 2025

(54) TECHNIQUES FOR GENERATING A TRAINING DATA SET FOR A MACHINE-LEARNING MODEL

(71) Applicant: Amazon Technologies, Inc., Seattle, WA (US)

(72) Inventors: Patrick Ian Wilson, Renton, WA (US); Dmitry Vladimir Zhiyanov, Redmond, WA (US); Lichao Wang, Redmond, WA (US); Jong Wan Kim, Bellevue, WA (US); Srinivas K Yellala, Bellevue, WA (US)

(73) Assignee: Amazon Technologies, Inc., Seattle, WA (US)

( * ) Notice: Subject to any disclaimer, the term of this patent is extended or adjusted under 35 U.S.C. 154(b) by 1069 days.

(21) Appl. No.: 17/214,448

(22) Filed: Mar. 26, 2021

(51) Int. Cl.
*G06N 20/00* (2019.01)
*G06F 7/24* (2006.01)
*G06N 3/088* (2023.01)

(52) U.S. Cl.
CPC .............. *G06N 3/088* (2013.01); *G06F 7/24* (2013.01)

(58) Field of Classification Search
CPC .................................. G06N 3/088; G06F 7/24
See application file for complete search history.

(56) References Cited

U.S. PATENT DOCUMENTS

| 9,501,466 | B1 * | 11/2016 | Namjoshi | G06F 16/3332 |
| 10,949,434 | B1 * | 3/2021 | Tirupattur Saravanan | G06Q 50/01 |
| 2009/0248605 | A1 * | 10/2009 | Mitchell | G06F 40/284 704/8 |
| 2016/0147943 | A1 * | 5/2016 | Ash | G16H 10/60 705/3 |
| 2021/0019700 | A1 * | 1/2021 | Lee | G06F 16/29 |
| 2021/0173822 | A1 * | 6/2021 | Paulraj | G06Q 40/02 |
| 2022/0237063 | A1 * | 7/2022 | Giddings | G06F 11/3409 |
| 2022/0300735 | A1 * | 9/2022 | Kelly | G06F 16/93 |

OTHER PUBLICATIONS

Babu, T. Ravindra, et al. "Geographical address classification without using geolocation coordinates." Proceedings of the 9th Workshop on Geographic Information Retrieval. 2015 (Year: 2015).*
Shan, Shuangli, et al. "Geographical address representation learning for address matching." World Wide Web 23 (2020): 2005-2022 (Year: 2020).*

* cited by examiner

*Primary Examiner* — Andrew T McIntosh
(74) *Attorney, Agent, or Firm* — Kilpatrick Townsend & Stockton LLP

(57) ABSTRACT

Systems and methods are provided herein for generating a synthetic training data set that can be used to train a machine-learning model to identify when two addresses match (e.g., when a user-defined address and an authoritative address match). The addresses may each be tokenized. Each candidate address can be scored based on a number of common tokens it shares with the user-defined address. The highest-scored candidate address may be selected as a matching address for the user-defined address. In some embodiments, a number of the remaining candidate address can be selected as negative examples (e.g., candidate addresses that do not match the user-defined address) based on, for example, historical delivery information associated with the corresponding addresses. In this manner, an expansive training data set may be generated using addresses associated with user profiles of an online service provider and a set of authoritative addresses obtained from an authoritative source.

20 Claims, 8 Drawing Sheets

202

| AUTHORITATIVE ADDRESS | CTS | TT |
|---|---|---|
| AA 1 | 2 | 3 |
| AA 2 | 3 | 3 |
| AA 3 | 3 | 4 |
| AA 4 | 3 | 4 |
| AA 5 | 3 | 4 |
| AA 6 | 4 | 4 |
| AA 7 | 1 | 3 |

204

| AUTHORITATIVE ADDRESS | CTS | TT |
|---|---|---|
| AA 6 | 4 | 4 |
| AA 2 | 3 | 3 |
| AA 3 | 3 | 4 |
| AA 4 | 3 | 4 |
| AA 5 | 3 | 4 |
| AA 1 | 2 | 3 |
| AA 7 | 1 | 3 |

(206 indicates dashed box around AA 1 and AA 7 rows)

208

| AUTHORITATIVE ADDRESS | CTS | TT |
|---|---|---|
| AA 6 | 4 | 4 |
| AA 2 | 3 | 3 |
| AA 3 | 3 | 4 |
| AA 4 | 3 | 4 |
| AA 5 | 3 | 4 |

210

| AUTHORITATIVE ADDRESS | USER-DEFINED ADDRESS | MATCH |
|---|---|---|
| AA 6 | UD 1 | TRUE |
| AA 2 | UD 1 | FALSE |
| AA 3 | UD 1 | FALSE |

FIG. 2

TECHNIQUES FOR GENERATING A TRAINING DATA SET FOR A MACHINE-LEARNING MODEL

BACKGROUND

Online service providers may collect users' addresses from time to time, for various reasons (e.g., to identify a billing address, a mailing address, a shipping address, and the like). Users may provide these address in a free form manner, having no enforced format or scheme, and thus, the specific input provided by different users may differ even when the users may be referring to the same address. The free form nature of these addresses may make difficult to determine when two user-entered addresses actually refer to the same address. This can complicate various workflows of the service provider. For example, if the service provider were to delivers items to these user-entered addresses, it would be beneficial to the shipping workflow to consolidate the delivery of these items based on identifying that the two user-entered addresses actually refer to the same address. Embodiments of the invention discussed herein address these and other problems, individually and collectively.

BRIEF DESCRIPTION OF THE DRAWINGS

Various embodiments in accordance with the present disclosure will be described with reference to the drawings, in which:

FIG. 2 includes a number of tables that illustrate an example process for selecting one or more candidate authoritative addresses to serve as a positive example or negative example in the training data set of FIG. 1, in accordance with at least one embodiment;

DETAILED DESCRIPTION

Figure 1:
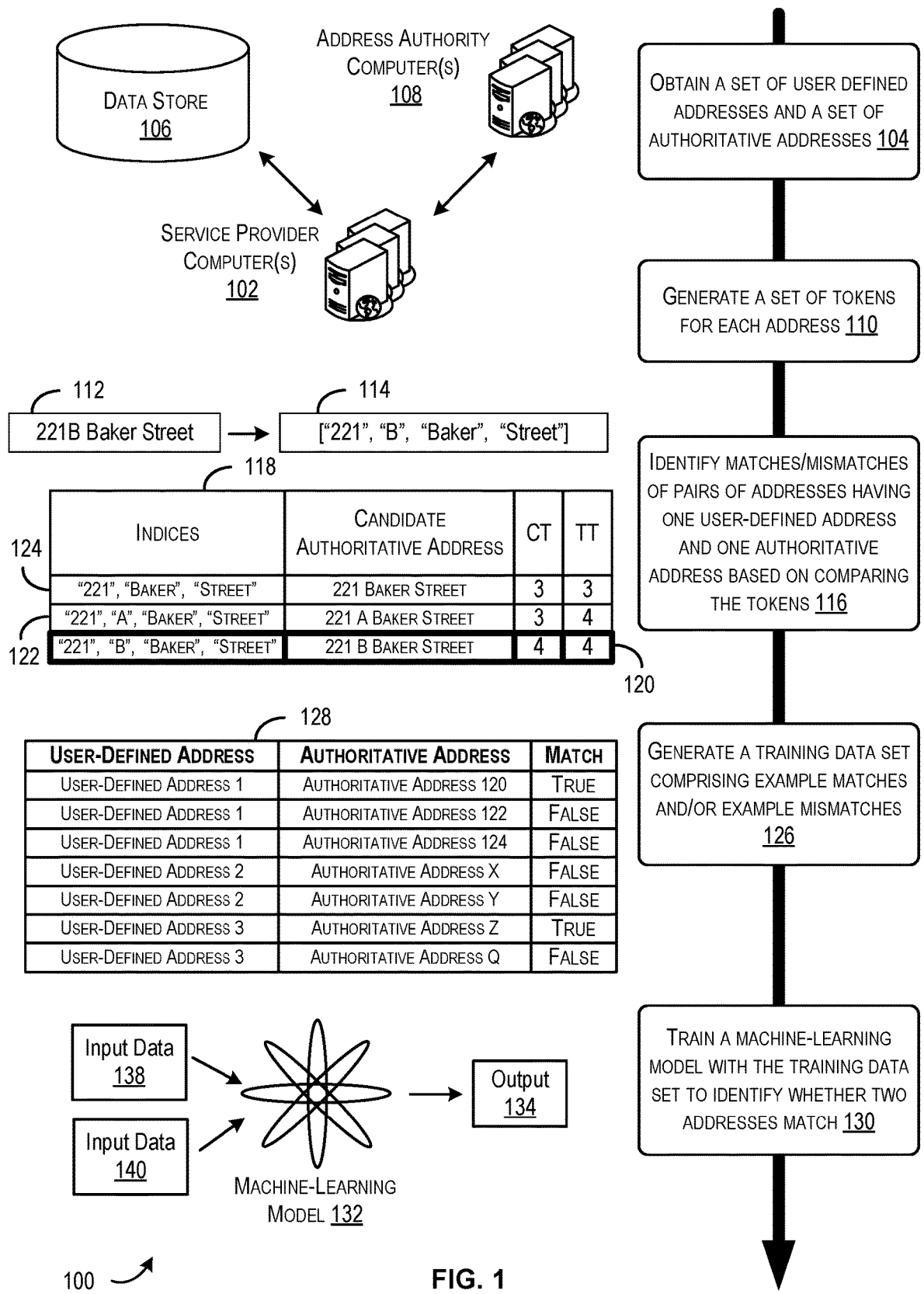
FIG. 1 is a flow for generating a training data set that may be utilized to train a machine-learning model to identify when two input addresses match, in accordance with at least one embodiment.

In the following description, for the purposes of explanation, specific details are set forth in order to provide a thorough understanding of certain embodiments. However, it will be apparent that various embodiments may be practiced without these specific details. The figures and description are not intended to be restrictive. The word "exemplary" is used herein to mean "serving as an example, instance, or illustration." Any embodiment or design described herein as "exemplary" is not necessarily to be construed as preferred or advantageous over other embodiments or designs.

The techniques disclosed, in at least one embodiment herein, provide for generating synthetic truth (referred to as a training data set) that may be utilized to train a machine-learning model using supervised learning techniques to assess a degree of similarity/dissimilarity between two input addresses (e.g., a user-defined address and an authoritative address). A user-defined address may be in any suitable form and may fail to conform to any particular format or structure. In this manner, the user-defined address may be considered "free form." In some situations, it may be beneficial to identify a normalized format for user-defined addresses and/or a geocode (e.g., geographic coordinates) that corresponds to that particular user-defined address. To that end, a set of authoritative addresses obtained from an authoritative source may be utilized. As a non-limiting example, authoritative data (e.g., geographic information system (GIS) data, an example of data that includes a set of authoritative addresses) may be obtained. An authoritative address, as used herein, is intended to refer to an address that is obtained from an authoritative source (e.g., a GIS data provider, a provider of normalized addresses/addresses that each follow a predefined scheme). In some embodiments, the authoritative data may provide a mapping between an authoritative address (e.g., an address expressed in a predefined format, using a set of approved abbreviations, etc.) and a location or object (e.g., expressed as a geocode, geographical coordinates, etc.) corresponding to that address. The authoritative addresses may follow a predefined format/scheme such that certain address terms (e.g., "Street") are expressed in the same manner across authoritative addresses (e.g., using either "Street," or "St.," and nothing else).

By way of example, an online retailer may provide numerous ways in which a user may provide a user-defined address. For example, a user may be provided interface to identify a default shipping address that they will most often be utilizing to ship various items subsequently procured from the online retailer. When the user enters this default shipping address, they may do so in any suitable manner. Consider the case in which a user (e.g., user A) enters in his workplace address as a default shipping address) while another user (e.g., user B) enters an address for their default shipping address that refers to the same workplace address, but is expressed slightly differently due to the ability for each user to freely express these addresses in whatever format they choose. It may be advantageous for that online retailer to know that users A and B are actually referring to the same address. Still further, it might be advantageous for the online retailer to associate a particular set of geographic coordinates to that workplace address, and by extension, each default shipping address of users A and B. In order to do so, a machine-learning model may be trained to identify when two input addresses are similar/dissimilar to some degree. Using such a model, a user-defined address may be matched to an authoritative address, and the geographic coordinates (e.g., the geocode) corresponding to that authoritative address may be then associated with the user-defined address (e.g., stored in a user profile with any suitable combination of the user-defined address, the authoritative address corresponding to the user-defined address, and the geocode corresponding to the authoritative address as identified from the authoritative data).

The techniques described herein enable a training data set (also referred to as "synthetic truth" or "synthetic truth data") to be generated with which such a model (e.g., a formula identified through machine-learning techniques, the formula being configured to identify output data (e.g., a similarity score) from input data (e.g., two addresses)) may be trained. By way of example, a set of user-defined addresses may be obtained. For example, in an online retailer context, a set of user-defined addresses may be obtained from user profiles corresponding to customers of the online retailer. A set of authoritative addresses may be obtained. For example, GIS data may be obtained from a GIS provider. An algorithm may then be executed to identify, for each user-defined address, a matching authoritative address and/or one or more authoritative addresses which do not match the user-defined address. To assess whether a user-defined address matches an authoritative address, both addresses might first be tokenized (e.g., separated into tokens that each represent a sub-portion of the address). An example tokenization algorithm is described in further detail with respect to FIG. 1. The authoritative addresses may each be indexed with their corresponding tokens. A searching algorithm (e.g., Elasticsearch) may be used to take the tokens of the user-defined address as input and identify a number of common tokens shared between the user-defined address and each instance of an authoritative address. Each authoritative address may be scored based on how many common tokens it shares with the user-defined address. A set of candidate authoritative addresses may be selected based on those scores. By way of example, the top 10 highest-scored authoritative addresses may be selected as candidates.

In some embodiments, a highest scored candidate may be identified by the system as being a match for the user-defined address. A training data set example may be generated that includes the user-defined address, the authoritative address identified as a match, and an indicator that indicates the relationship (match/does not match) between the user-defined address and the authoritative address. When an example indicates a match, it can be referred to as a "positive example." Conversely, when the example indicates the addresses do not match, the example can be referred to as a "negative match." The remaining candidates from the set (now excluding the highest-scored candidate) may be assessed for potential inclusion in a set of one or more negative examples for the training data set. In some embodiments, each user-defined address may be associated with historical delivery data. For example, each time a user purchased an item from the online retailer and the item was delivered, the delivery agent, upon delivery may identify a location corresponding to the delivery (e.g., geographic coordinates for the delivery location). This location data may be stored over time such that a given user profile associated with a user-defined address, may also be associated with any suitable number of geographic coordinates corresponding to any suitable number of past deliveries. In some embodiments, the historical delivery data associated with a given user-defined address may be utilized to improve the training data set by enabling a number of negative examples to be identified.

For example, the location of a particular delivery may be compared to a location corresponding to a particular candidate authoritative address. If the two locations are separated by a distance that exceeds a predefined threshold distance, then it can be ascertained that the candidate authoritative address is not a match for the user-defined address. A new negative example can be added to the training data set that includes the user-defined address, the authoritative address identified being too far away from the delivery location (e.g., over the predefined threshold distance), and an indicator that indicates the two addresses do not match. It should be appreciated that any suitable number of delivery locations may be used. For example, four delivery locations corresponding to four historical deliveries may be utilized to identify a single location. As a non-limiting example, a center point of four historical delivery locations may be identified and in some embodiments, the center point may be utilized to assess the distance between the user-defined address and the candidate authoritative address.

By utilizing the techniques disclosed herein, a rich and extensive training data set may be generated with which an address matching machine-learning model may be trained. This alleviates an entity responsible for training such a model from having to perform the tedious task of generating training data set examples manually. Additionally, by utilizing historical delivery locations, the system may automatically enrich the training data set with even more examples in a manner that was not previously used.

The techniques described above and below may be implemented in a number of ways and in a number of contexts. Several example implementations and contexts are provided with reference to the following figures, as described below in more detail. However, the following implementations and contexts are but a few of many.

Moving on to FIG. 1 which illustrates a flow 100 for generating a training data set that may be utilized to train a machine-learning model to identify when two input addresses match, in accordance with at least one embodiment. In some embodiments, the flow 100 may be performed by service provider computer(s) 102. The service provider computer(s) may be one or more devices that provide standalone functionality corresponding to the operations of flow 100, or the service provider computer(s) may operate as part of a system that provides a service (e.g., hosting of an online retail website).

The flow 100 may begin at 104, where a set of user-defined address and a set of authoritative addresses may be obtained. By way of example, the service provider computer(s) 102 may obtain a previously stored set of user-defined addresses from a data store 106. In some embodiments, the data store 106 may be configured to store user profile data corresponding to any suitable number of user profiles (e.g., data corresponding to a user account managed by an online retailer). In some embodiments, the service provider computer(s) 102 may obtain a set of authoritative addresses from address authority computer(s) 108. The address authority computer(s) 108 may be any suitable type and number of devices that are configured to manage a set of authoritative addresses. In some embodiments, at least one of the authoritative addresses may be associated with location information (e.g., a geocode, latitude/longitude coordinates, or other suitable data that uniquely identifies a location). By way of example only, the address authority computer(s) 108 may be operated on or behalf of a GIS data provider and the set of authoritative addresses obtained by the service provider computer(s) 102 may include GIS data that provides a mapping between each authoritative address and a corresponding geocode that identifies a location corresponding to that address.

At 110, a set of tokens may be generated for each address. By way of example, the tokens may be generated using a tokenization algorithm. The tokenization algorithm may be configured to take an address as input. For example, user-defined address 112 is an example of a user-defined address (e.g., an address that was originally entered by a user and has not been modified since entry). As part of the tokenization algorithm, the user-defined address 112 may be converted to a string of alphanumeric characters. The tokenization algorithm may then parse the string, determining the boundaries between tokens based at least in part on 1) identifying a transition from letter (also referred to as an "alphabetic character") to a number (also referred to as a "numeric character"), 2) identifying a transition from a number to a letter, or 3) identifying a character that corresponds to a white space or one of a set of predefined special characters (e.g., "#", "@", "-", ",", etc.). As one example, the user-defined address 112 may be converted to a string "221B Baker Street." The tokenization algorithm may then parse the string to identify a first token. When the transition between "1" and "B" is encountered, the first token may be set to "221" and a new token generated (e.g., a token starting with "B"). The parse may then encounter a white space, which may be treated as another token boundary, thus, a third token may be generated. Continuing with the parsing, the letters "B," "a," "k," "e," "r," may be sequentially added to the third token before another white space is encountered. A fourth token may be generated in response to encountering that white space. The parsing may continue, sequentially adding the letters "S," "t," "r," "e." "e e," and "t," to the fourth token until the end of the string is encountered. Thus, according to this tokenization algorithm, tokens 114 may correspond to the set of tokens obtained through tokenization of the user-defined address 112.

At 116, matches/mismatches of pairs of addresses may be identified. In at least one embodiments, each pair may include one user-defined address and one authoritative address based on comparing tokens of each. By way of example, three candidate authoritative addresses may be included in the set of authoritative address obtained from the address authority computer(s) 108 at 104. Each candidate authoritative address may be parsed in a similar manner as described at 110. Each candidate authoritative address may be indexed with one or more indices that correspond to a token of that candidate authoritative address. Each index may be utilized to retrieve the candidate authoritative address and/or each index may indicate the existence of a token in a corresponding candidate authoritative address. An example of the indices for each candidate authoritative address is provided in table 118.

In some embodiments, the set of tokens identified from user-defined address (e.g., tokens 114) may individually be compared to the tokens corresponding to the candidate authoritative address to identify how many tokens the pair of addresses share. Each candidate authoritative address may be associated with a number of tokens (e.g., common tokens (CT)) it shares with the token 114, and a total number of tokens (e.g., total tokens (TT)) included in the candidate authoritative address. Examples numbers for common tokens, and total tokens are also provided in table 118 as depicted in FIG. 1. In at least one embodiment, a searching algorithm (e.g., Elasticsearch) may be utilized to quantity a number of common tokens. By way of example, the searching algorithm may include a constant scoring function that is configured to increment a score every time a candidate search result (e.g., a candidate address) has an index that matches a term of a query (e.g., a query comprising the tokens 114). Thus, it may be a function of this search algorithm which assigns a score corresponding to the number of common tokens shared between a candidate authoritative address and the user-defined address 112. In some embodiments, one candidate authoritative address (e.g., authoritative address 120) may be selected as a match for the user-defined address 112 based at least in part on a predefined protocol set (e.g., a predefined set of rules). The predefined protocol set may specify that a candidate authoritative address that has the greatest number of common terms, and a number of common terms that is closest to the number of total number of tokens in the candidate authoritative address, is to be selected as the match for the user-defined address being evaluated (e.g., the user-defined address 112). Thus, the authoritative address 120 may be selected based at least in part on having the highest number of common tokens with respect to tokens 114. In some embodiments, the ratio of common tokens to total number of tokens may be used as a factor for selection. Thus, the authoritative address 120 may also be selected based at least in part on identifying that every token in the authoritative address 120 matches a token in the user-defined address 112. If the authoritative address 120 was not in the set of authoritative addresses, and instead a best match was to be selected from authoritative address 122 or authoritative address 124, authoritative address 124 may be selected based on having the same number of tokens in common with tokens 114 as the authoritative address 122, but also having a greater ratio of common token to total tokens (e.g., 3 out of 3, 100% common, etc.) than that of authoritative address 122 (e.g., 3 out of 4, 75% common, etc.).

At 126, a training data set 128 comprising pairs of addresses that are individually labeled as a match/not a match may be generated. The training data set may include examples corresponding to the matches (e.g., a match between the user-defined address 112 and the authoritative address 120, a positive example) and examples corresponding to pairs of addresses that did not match (e.g., the user-defined address 112 and the authoritative address 122, a negative example).

At 130, the training data set (or at least some portion of the training data set 128) may be utilized to train a machine-learning model (e.g., machine-learning model 132) using any suitable machine-learning algorithm (e.g., supervised, unsupervised, semi-supervised algorithms) to identify a similarity score quantifying a degree of similarly between two input addresses (e.g., a user-defined address and an authoritative address). The machine-learning model 132, further described with respect to FIG. 4, may be utilized to identify output 134 (e.g., output indicating a similarity score between a user-defined address corresponding to input data 136 and an authoritative address corresponding to input data 138). The output 134 may be utilized (e.g., with other outputs provided by the machine-learning model 132) to identify/select a particular candidate authoritative address as a match for a particular user-defined address. The machine-learning model may also be utilized in contexts in which a particular authoritative address is to be selected as a recommendation. By way of example, a user interface may enable the user to enter in a free form address (e.g., a user-defined address). The techniques described above may be utilized to identify a set of authoritative addresses that include potential matches. Each authoritative address may be paired with the user-defined address and the pair provided as input to machine-learning model 132 which provides a similarity score corresponding to each pair. A pair having the highest score may be selected and the selected authoritative address may be presented to the user as an optional replacement to the user-defined address originally provided by the user.

FIG. 2 includes a number of tables that illustrate an example process for selecting one or more candidate authoritative addresses to serve as a positive example or negative example in the training data set of FIG. 1 (e.g., the training data set 128), in accordance with at least one embodiment. The tables provided in FIG. 2 may corresponding to a set of authoritative addresses (e.g., as obtained from the authoritative source computer(s) 108 of FIG. 1) or a subset of authoritative addresses selected from a larger set of authoritative addresses. In the example provided in FIG. 2, the set of authoritative addresses obtained from the authoritative source computer(s) 108, may include a larger set from which a subset of authoritative addresses are selected as candidates.

By way of example, each of the authoritative addresses in the set may be scored as described above in connection with FIG. 1. That is, a searching algorithm may be utilized with query tokens (e.g., tokens corresponding to the user-defined address for which candidate authoritative addresses are being selected). The searching algorithm may include a constant scoring function that is configured to increment a score for an authoritative address each time a common token is identified between the query tokens and the tokens of the authoritative address. In some embodiments, a total number of tokens may be identified for each authoritative address and these totals may be stored as an association with the authoritative address.

As a non-limiting example, table 202 includes a number of authoritative addresses (e.g., AA 1-7) which were selected as having the highest (e.g., or at least over a predefined threshold) number of common tokens with respect to the query tokens. A common token score (CTS) may represent a score assigned to a given authoritative address based on identifying the number of common tokens the authoritative address shares with the query tokens.

In some embodiments, the authoritative addresses 1-7 (AA 1-7 of FIG. 2, collectively referred to as the candidate authoritative addresses (CAAs)) may be selected as a candidate for the user-defined address in no particular order. Thus, in some embodiments, the CAAs may be sorted based at least in part on a sorting algorithm that factors in the CTS and a total number of tokens (TT) corresponding to each AA. Table 204 represents the CAAs after execution of the sorting algorithm has been performed. As depicted in table 204, AA 6 may be situated in a first position (e.g., a first row) of the table 204 based at least in part on having the highest CTS, which is also closest to its total number of tokens (e.g., 4 out of 4). Similarly, AA 2 may be positioned in the second position of the table 204 based at least in part on its CTS and TT. AA 2 may be positioned at a higher position in the table 204 over AA 3 at least because while the CTS score is equal between the two, the ratio of common tokens to the number of total tokens of AA 2 is greater than that of AA 3. Thus, the placement of a particular authoritative addresses within the set of sorted candidates AAs may be a function of any suitable combination of the common token score and/or the total tokens. A candidate score (not depicted) for each AA may be assigned as a function of the common token score and the total tokens and the candidate score may be used to sort the candidate into the order/position depicted in table 204.

One or more of the CAAs may be filtered/removed from the sorted set of CAAs. As a non-limiting example, the CAAs may be limited to a particular number (e.g., 5) and only the highest-positioned/scored AAs corresponding to that number may be utilized. By way of example, as AAs 6, 2, 3, 4, 5 are the five highest scored AAs of the CAAs, the CAAs corresponding to the set 206 may be removed, or otherwise filtered from the set of CAAs. In some embodiments, the AAs corresponding to the set 206 may be removed based at least in part on other factors, such as being assigned a CTS that is under a predefined threshold value (e.g., each AA in the set 206 does not have three or more tokens in common with the query tokens).

Table 208 is intended to present the CAAs after the AAs corresponding to the set 206 are removed (if any CAAs were selected for removal/filtering). In some embodiments, only one candidate authoritative address may be selected as representing a match for the user-defined address corresponding to the query tokens. In the ongoing example, AA 6 may be selected as being a match for the user-defined address based at least in part on being positioned highest in the table 208. Based on this selection, AA 6 may be added to training data set 210 as a positive example. That is, AA 6, may be stored with a record that also includes the user-defined address corresponding to the query tokens and a label that indicates a relationship between the two (e.g., an indicator that indicates the two addresses are considered a match).

Figure 3:
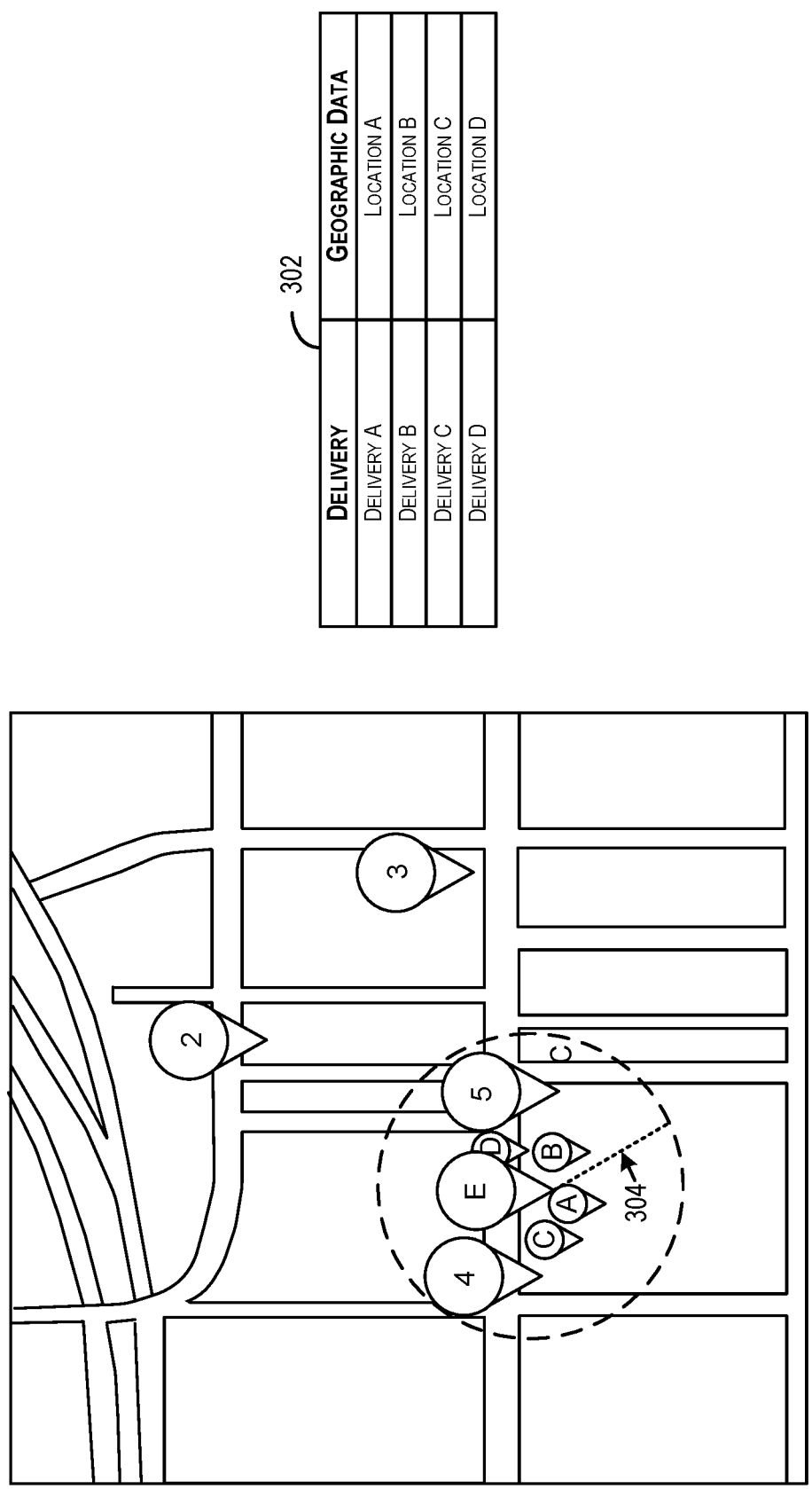
FIG. 3 is a block diagram illustrating techniques for verifying, using historical delivery information, that a particular candidate authoritative address matches and/or does not match a user-defined address, in accordance with at least one embodiment.

In some embodiments, the remaining candidate authoritative addresses (e.g., set 212 including AA 2, 3, 4, and 5, or any suitable combination of AA 2, 3, 4, and/or 5) may be further utilized to identify negative examples. FIG. 3 further describes a process for identifying negative examples from this data. In some embodiments, and as depicted in FIG. 3, some of the candidate authoritative addresses may include the same number of common tokens, although they may not necessarily have the same exact tokens in common with the user-defined address. By way of example, AA 2, 3, 4, and 5 may each have three tokens in common with the user-defined address. For example, the user-defined address may have tokens A, B, C, D, and E. AA 2 may include tokens B, D, and E. AA 3 may include tokens A, B, and E. AA 4 may include A, B, and C. AA 5 may include A, B, and E. In some embodiments, a relative importance of the tokens may not be known. That is, it may not be known that token B may be more important to a similarity analysis (e.g., more influential for a subsequent similarity score) than token E, or that token D is the most important token for a similarity analysis (e.g., a token that will most influence the subsequent similarity score quantifying the similarity between the user-defined address and a particular authoritative address). In some embodiments, when these types of ambiguities exist, a predefined rule set may be used to cause such examples to be labeled as ambiguous (e.g., with a label such as "ambiguous," "unsure," etc.) and/or specify that at least one of AA 2-5 be excluded from the training data set 210. In other examples, a word list or other suitable predefined data may be utilized to provide an indication of the importance of one or more of the user-defined tokens on a subsequent similarity score. Thus, in some embodiments, AA 2-5 may be excluded (or not excluded) based at least in part on this predefined importance.

FIG. 3 is a block diagram 300 illustrating techniques for verifying, using historical delivery information, that a particular candidate authoritative address matches and/or does not match a user-defined address, in accordance with at least one embodiment. By way of example, the user-defined address corresponding to the query tokens may be associated with any suitable number of historical deliveries (e.g., delivery A, delivery B, delivery C, delivery D) as indicated in table 302. In some embodiments, as a delivery is made, an agent may scan a barcode of a package, for example, an in response to the scan, a location of the scanner may be identified and associated with the delivery. In this manner (or in any suitable manner), a historical delivery may be associated with geographic data that indicates a particular location of the corresponding delivery (e.g., location A, location B, location C, location D). In some embodiments, geographic data (e.g., geocodes) of each AA of the set 212 may be used to identify negative examples (e.g., AAs that cannot be matches for the user-defined address because they are identified as being too far away from the user-defined address). In some embodiments, a center point (e.g., center point E) may be calculated in any suitable manner to represent a center location corresponding to the locations A-D. The location of center point E may be used with a predefined distance (e.g., a distance corresponding to distance 304) to identify whether the location of each AA is within the distance 304 or outside the distance 304. As depicted in FIG. 3, the locations 4 and 5, corresponding to AA 4 and AA 5, respectively may be identified as being within the distance 304 from the location corresponding to center point E, while the locations 2 and 3, corresponding to AA 2 and AA 3, respectively, may be identified as being outside the distance 304 from the location corresponding to center point E as depicted in FIG. 3. Accordingly, AAs 2 and 3 may be identified as not matching the user-defined address due to being located at a distance that is greater than distance 304 from center point E.

It should be appreciated that any suitable number of delivery locations may be utilized (e.g., the last five historical deliveries, all historical deliveries, the last historical delivery, etc.). Similarly, distance determinations need not be ascertained from a center point, but may instead be ascertained based on a specific historical delivery location. Although not described above in FIG. 2, it should be appreciated that a similar distance calculation may be utilized to verify that AA 6 of table 210 is a good match for the user-defined address. That is, the location corresponding to AA 6 may be compared to one or more locations (or a center point such as center point E) to verify that the location corresponding to AA 6 is within a predefined distance threshold with respect to the corresponding one or more historical deliveries. In some embodiments, if AA 6 is within that distance threshold (which could be the same distance or a different distance from distance 304), then AA 6 may be considered a valid match for the user-defined address. Otherwise, AA 6 may be discarded altogether and excluded from the training data set or AA 6 may be included as another negative example (e.g., an AA that does not match the user-defined address).

Returning to FIG. 2, the table 210 may further include AA 2 and AA 3 based at least in part on the determinations made with respect to the locations corresponding to AA 2 and AA 3 as compared to one or more locations associated with historical delivery data. The training data set ultimately used as the training data set to train a machine-learning model (e.g., the machine-learning model 132 of FIG. 1, described in more detail below with respect to FIG. 4), may include at least the examples provided in table 210, although additional examples may be included that correspond to other AAs identified as matching or non-matching other user-defined addresses. Thus, the examples of table 210 as depicted in FIG. 2, may depict only a subset of the actual training data set that may be subsequently used to train the machine-learning model.

The tables 202, 204, and 208 are used for illustration purposes only. It should be appreciated that any suitable container (e.g., a list, an object, a vector, an array, etc.) may be utilized for storing and/or ordering a set of candidate authoritative addresses to perform the operations discussed in connection with FIG. 3.

Figure 4:
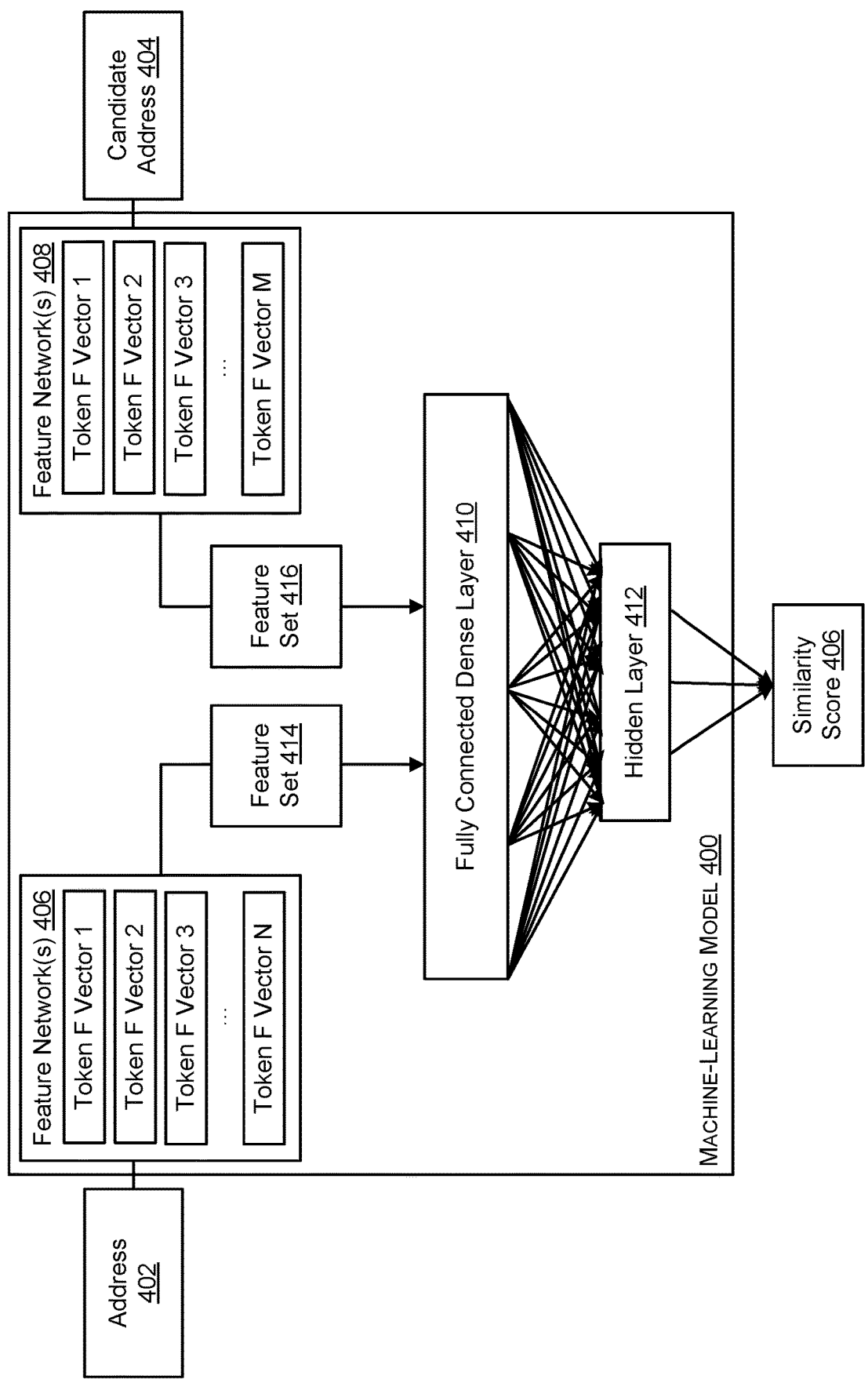
FIG. 4 illustrates an example machine-learning model that can be trained using the training data set generated with the techniques described in FIGS. 1-3, in accordance with at least one embodiment.

FIG. 4 illustrates an example machine-learning model 400 (e.g., an example of the machine-learning model 132 of FIG. 1) that can be trained using a training data set (e.g., a training data set that includes at least the training data set 210 of FIG. 2), at least part of which is generated with the techniques described in FIGS. 1-3, in accordance with at least one embodiment. The machine-learning model 400 may be trained to generate, given a pair of input addresses, a similarity score which represents how similar the two addresses are two one another, or how dissimilar the two address are with respect to one another. In at least one embodiments, an example of the training data set may be generated using the techniques described above. This example may include two addresses (e.g., a user-defined address and an authoritative address) and an indicator (e.g., a Boolean, a label, an enumeration, etc.) that indicates that either 1) the two addresses match or 2) the two address do not match. Examples that indicate two addresses that match may be referred to as "positive examples" and examples that indicate two addresses that do not match may be referred to as "negative examples." The training data set (also referred to as "labeled data") may include any suitable number and combination of positive examples and/or negative examples. In some embodiments, the number of positive examples of the labeled data need not be equal to the number of negative examples of the labeled data.

In some embodiments, the machine-learning model 400 may be trained using a variety of features extracted from the training data set (e.g., features extracted from address 402, an example of a user-defined address, and candidate address 404, an example of an authoritative address). The machine-learning model 400 may include any suitable number and hierarchy of layers. For example, the machine-learning model 400 may be a neural network and may include a token model layer for capturing characteristics of individual tokens (e.g., the alpha or numeric tokens generated by the tokenization as described above in FIG. 1) and an attribute model layer for capturing characteristics of potentially multi-token attributes) to which the output of the token model is provided as input, and one or more fully-connected or dense layers (e.g., fully-connected dense layer 410, hidden layer 410, etc.) to which the output of the attribute model layer may be provided as input. In some embodiments, the feature network(s) 406 and feature network(s) 408 may individually include the token model layer and attribute model layer functionality. As depicted in FIG. 4, the feature network(s) 408 and 410 may be arranged in a mirrored fashion (also referred to as a "Siamese" network. The output of the machine-learning model 400 may include, for the pair of inputs (e.g., address 402 and candidate address 404), a numerical score (e.g., similarity score 410) indicating a degree to which the inputs are similar (or dissimilar). During the training of the machine-learning model, a cross-entropy loss metric between the numerical score (e.g., expressed as a probability value indicating the similarity/dissimilarity between the inputs) and the similarity indicator label (e.g., a value indicating a match/not a match) of the training example may be used as an objective function. Other objective functions may be used in other embodiments.

One or more transformations or pre-processing operations may be performed on the raw addresses to generate a set of tokens for each address. For example, address 402 and candidate address 404 may each be tokenized (separated by tokens that group a sequence of characters or numbers along boundaries such as white spaces, punctuation marks, or transitions from alphabetic characters to numbers or numbers to alphabetic characters) to generate a respective set of tokens. This process was described in more detail with respect to FIG. 1 and will not be repeated here for brevity. In some embodiments, the set of tokens for each address may be normalized and/or stemmed and provided as input to feature network(s) 408 and 410, respectively.

Feature network(s) 408 and 410 may be mirrored (also referred to as a "Siamese neural network architecture" or "Siamese architecture," for brevity) where each include one or more hidden and/or dense layers (not depicted). In Siamese architectures, during training, the weights and parameters of a given network of a mirrored pair may be learned based on a common shared objective function, such as a function which uses a cross-entropy metric between a predicted similarity score (e.g., a probability of a match between the addresses of a training example) and a match indicator label assigned to the corresponding training example. In at least one implementation, changes to the weight of one artificial neuron in one network of a mirrored pair of networks (e.g., feature network(s) 408)) may be replicated at the corresponding artificial neuron or node of the other network (e.g., feature network(s) 410). A respective token model of a feature network (e.g., feature network(s) 408) may output respective numeric vectors and/or matrices representing the feature set of a given token which may then be provided as input to an attribute model of that feature network (e.g., feature network(s) 408). Thus, one function performed by the feature network(s) 406 is to extract token features from each token of the address 402. Similarly, one function performed by the feature network(s) 408 is to extract token features from each token of Candidate Address 404.

In various embodiments, recurrent neural network (RNN) units may be employed at one or more layers of the model hierarchy. RNN s, which may comprise loops of connections between nodes or neurons, may be able to persist (or have a "memory" of) information that was previously analyzed in various embodiments, and may thus be able to incorporate information about the sequence or relative positions of various text tokens within attributes of the item descriptors in such embodiments. In some embodiments, Long Short Term Memory (LSTM) units may be used for one or more RNN layers of the deep neural network model 152. In other embodiments, other RNN variants may be used, such as gated recurrent units (GRUs), bi-directional RNNs, depth-gated RNNs, clockwork RNNs and the like. In some embodiments, RNNs may not be used. In at least some embodiments, the token model layer of feature network(s) 406 may utilize a plurality of token features. For example, in some embodiments the token features may comprise representations of the characters which form (a normalized version of) the token, token length (the number of characters/numbers forming the token), token casing and the like. In at least one embodiment, the token model may be include programmatic interfaces that may be utilized by the machine-learning model 400 to add or modify token-related features.

Example feature extraction and encoding operations of the token model layer may be performed to generate input for the attribute model layer (not depicted) of feature network(s) 406 and 408. By way of example, a single token may be processed by the token model layer to generate one or more token feature vectors as output, where a token feature vector (e.g., token F vectors 1-N) corresponds a feature extracted from a token of address 402. Similarly, one or more token feature vectors (e.g., token F vectors 1-M) may be generated by the feature network(s) 408 where each token feature vector corresponds to a token of the candidate address 404. In some embodiments, N corresponds to the number of tokens of address 402 and M corresponds to the number of tokens of candidate address 404. One feature of a token may include a token length (e.g., a quantity of characters in a given token, a quantity of numbers in a given token). Thus, the token length may be transformed into a token length vector (e.g., token F vector 1) by a learned token length embedding layer of the token model layer. The token model may include a feature representing the token type (e.g., a token type of "t" indicating alphabetic characters only and a token type of "d" indicating numeric characters only). The value corresponding to the token type for the token may be provided as input to a one-hot vector generator which may generate a token type vector (e.g., token F vector 2) that indicates the token type for that token. In some embodiments, a token feature may include the case of the original token (e.g., the ordering and mix of lower and upper case characters). In some embodiments, a predefined category label (e.g., "Az") may be used to indicate the order and mix of lower/upper case characters in the token. In some embodiments, the category label may correspond to an enumerated value (e.g., 0, 1, 2, 3, 4, 5, each value corresponding to a different category label). An n-element one-hot vector (e.g., where n is the number of different category labels available) may be generated representing the token case designation of the given token.

Each of the token feature vectors may be provided as input to an attribute model layer (not depicted) of the feature network(s) 406 and 408. The attribute model layer may include a LSTM unit which is configured to take the identified token feature vectors as input. The attribute model layer may be configured to capture characteristics of potentially multi-token attributes and output one or more vector(s) (referred to as "attribute vectors") that express those attributes. The superset of the token feature vectors generated by the token model layer and the attribute vectors generated by the attribute model layer (e.g., feature set 414 and feature set 416, respectively) may be utilized as input to the fully-connected dense layer 410. The output(s) of the fully-connected dense layer may be provided to the hidden layer 412 which may be configured to output similarity score 406. As discussed above, the similarity score 406 may represent a probability (e.g., a value between 0 and 1) that expresses the similarity/dissimilarity between the address 402 and the candidate address 404. The process for assessing the similarity score for a given pair of addresses including one user-defined address (e.g., address 402) and an authoritative address (e.g., candidate address 404) may be performed any suitable number of times.

Figure 5:
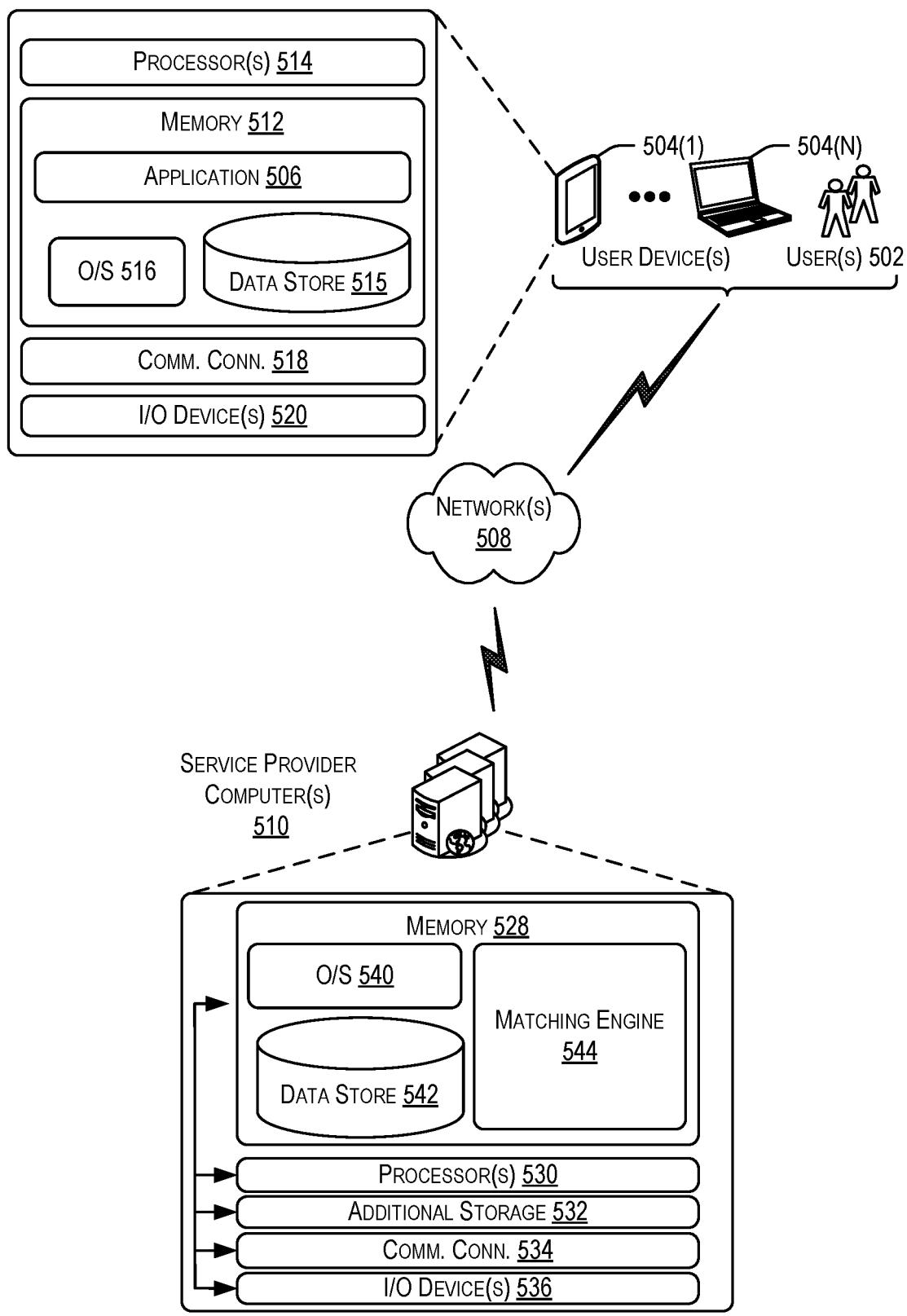
FIG. 5 illustrates components of a matching system, in accordance with at least one embodiment.

FIG. 5 illustrates components of a system 500 according to a particular embodiment. In system 500, one or more users 502 may utilize a user device (e.g., a user device of a collection of user devices 504(1)-(N) (collectively, user devices 504) to navigate to a network page provided by the service provider computer(s) 510 (e.g., an example of service provider computer(s) 102 of FIG. 1). For example, the user may access a user interface accessible through an application 506 running on the user devices 504 via one or more networks 508. In some aspects, the application 506 operating on the user devices 504 may be hosted, managed, and/or provided by a computing resources service or service provider, such as by utilizing one or more service provider computer(s) 510.

In some examples, the networks 508 may include any one or a combination of many different types of networks, such as cable networks, the Internet, wireless networks, cellular networks, and other private and/or public networks. While the illustrated example represents the users 502 accessing application functionality over the networks 508, the described techniques may equally apply in instances where the users 502 interact with the service provider computer(s) 510 via the one or more user devices 504 over a landline phone, via a kiosk, or in any other suitable manner. It should be appreciated that the described techniques may apply in other client/server arrangements, as well as in non-client/server arrangements (e.g., locally stored applications, etc.).

The service provider computer(s) 510, perhaps arranged in a cluster of servers or as a server farm, may host the application 506 operating on the user devices 504 and/or cloud-based software services. Other server architectures may also be used to host the application 506 and/or cloud-based software services. The application 506 (e.g., a web browser, a shopping application, etc.) operating on the user devices 504 may be capable of handling requests from the users 502 and serving, in response, various user interfaces that can be rendered at the user devices 504. By way of example, the application 506 may provide any suitable user interface elements for obtaining one or more user-defined addresses. The application 506 operating on the user devices 504 can present any suitable type of website that supports user interaction, including search engine sites, item detail pages, shopping cart network pages, and the like. The described techniques can similarly be implemented outside of the application 506, such as with other applications running on the user devices 504.

The user devices 504 may be any suitable type of computing device such as, but not limited to, a mobile phone, a hand-held scanner, a touch screen device, a smartphone, a personal digital assistant (PDA), a laptop computer, a desktop computer, a thin-client device, a tablet PC, an electronic book (e-book) reader, etc. In some examples, the user devices 504 may be in communication with the service provider computer(s) 510 via the networks 508, or via other network connections.

In one illustrative configuration, the user devices 504 may include at least one memory 512 and one or more processing units (e.g., processor(s) 514). The processor(s) 514 may be implemented as appropriate in hardware, computer-executable instructions, firmware, or combinations thereof. Computer-executable instruction or firmware implementations of the processor(s) 514 may include computer-executable or machine-executable instructions written in any suitable programming language to perform the various functions described.

The memory 512 may store program instructions that are loadable and executable on the processor(s) 514, as well as data generated during the execution of these programs. Depending on the configuration and type of user computing device, the memory 512 may be volatile (such as random access memory (RAM)) and/or non-volatile (such as read-only memory (ROM), flash memory, etc.). The user devices 504 may also include additional removable storage and/or non-removable storage including, but not limited to, magnetic storage, optical disks, and/or tape storage. The disk drives and their associated computer-readable media may provide non-volatile storage of computer-readable instructions, data structures, program modules, and other data for the computing devices. In some implementations, the memory 512 may include multiple different types of memory, such as static random access memory (SRAM), dynamic random access memory (DRAM), or ROM.

Turning to the contents of the memory 512 in more detail, the memory 512 may include an operating system 516, one or more data stores 515, and one or more application programs, modules, or services for implementing the techniques disclosed herein, provided via the application 506. The application 506 may be configured to receive, store, and/or display a network page or other interface for interacting with the service provider computer(s) 510. Additionally, the memory 512 may store access credentials and/or other user information such as, but not limited to, user IDs, passwords, and/or other user information. In some examples, the user information may include information for authenticating an account access request such as, but not limited to, a device ID, a cookie, an IP address, a location, or the like.

The user devices 504 may also contain communications connection(s) 518 that allow the user devices 504 to communicate with a stored database, another computing device or server (e.g., the service provider computer(s) 510), user terminals and/or other devices on the networks 508. The user devices 504 may also include I/O device(s) 520, such as a keyboard, a mouse, a pen, a voice input device, a touch input device, a display, speakers, a printer, etc.

In some aspects, the service provider computer(s) 510 may also be any suitable type of computing devices such as, but not limited to, a mobile phone, a smart phone, a personal digital assistant (PDA), a laptop computer, a desktop computer, a server computer, a thin-client device, a tablet PC, etc. Additionally, it should be noted that in some embodiments, the service provider computer(s) 510 are executed by one more virtual machines implemented in a hosted computing environment. The hosted computing environment may include one or more rapidly provisioned and released computing resources, which computing resources may include computing, networking and/or storage devices. A hosted computing environment may also be referred to as a cloud-computing environment. In some examples, the service provider computer(s) 510 may be in communication with the user devices 504 and/or other service providers via the networks 508 or via other network connections. The service provider computer(s) 510 may include one or more servers, perhaps arranged in a cluster, as a server farm, or as individual servers not associated with one another. These servers may be configured to implement the functionality described herein as part of an integrated, distributed computing environment.

In one illustrative configuration, the service provider computer(s) 510 may include at least one memory 528 and one or more processing units (e.g., processor(s) 530). The processor(s) 530 may be implemented as appropriate in hardware, computer-executable instructions, firmware, or combinations thereof. Computer-executable instruction or firmware implementations of the processor(s) 530 may include computer-executable or machine-executable instructions written in any suitable programming language to perform the various functions described.

The memory 528 may store program instructions that are loadable and executable on the processor(s) 530, as well as data generated during the execution of these programs. Depending on the configuration and type of service provider computer(s) 510, the memory 528 may be volatile (such as RAM) and/or non-volatile (such as ROM, flash memory, etc.). The service provider computer(s) 510 or servers may also include additional storage 532, which may include removable storage and/or non-removable storage. The additional storage 532 may include, but is not limited to, magnetic storage, optical disks and/or tape storage. The disk drives and their associated computer-readable media may provide non-volatile storage of computer-readable instructions, data structures, program modules, and other data for the computing devices. In some implementations, the memory 528 may include multiple different types of memory, such as SRAM, DRAM, or ROM.

The memory 528, the additional storage 532, both removable and non-removable, are all examples of computer-readable storage media. For example, computer-readable storage media may include volatile or non-volatile, removable or non-removable media implemented in any method or technology for storage of information such as computer-readable instructions, data structures, program modules, or other data. The memory 528 and the additional storage 532 are all examples of computer storage media. Additional types of computer storage media that may be present in the service provider computer(s) 510 may include, but are not limited to, PRAM, SRAM, DRAM, RAM, ROM, EEPROM, flash memory or other memory technology, CD-ROM, DVD or other optical storage, magnetic cassettes, magnetic tape, magnetic disk storage or other magnetic storage devices, or any other medium which can be used to store the desired information and which can be accessed by the service provider computer(s) 510. Combinations of any of the above should also be included within the scope of computer-readable media.

Alternatively, computer-readable communication media may include computer-readable instructions, program modules, or other data transmitted within a data signal, such as a carrier wave, or other transmission. However, as used herein, computer-readable storage media does not include computer-readable communication media.

The service provider computer(s) 510 may also contain communications connection(s) 534 that allow the service provider computer(s) 510 to communicate with a stored database, another computing device or server, user terminals and/or other devices on the networks 508. The service provider computer(s) 510 may also include I/O device(s) 536, such as a keyboard, a mouse, a pen, a voice input device, a touch input device, a display, speakers, a printer, etc.

Turning to the contents of the memory 528 in more detail, the memory 528 may include an operating system 540, one or more data stores 542, and/or one or more application programs, modules, or services (not depicted) for implementing the features disclosed herein (e.g., such as the techniques described above with respect to FIGS. 1-4 which may be performed by the matching engine 544).

Figure 6:
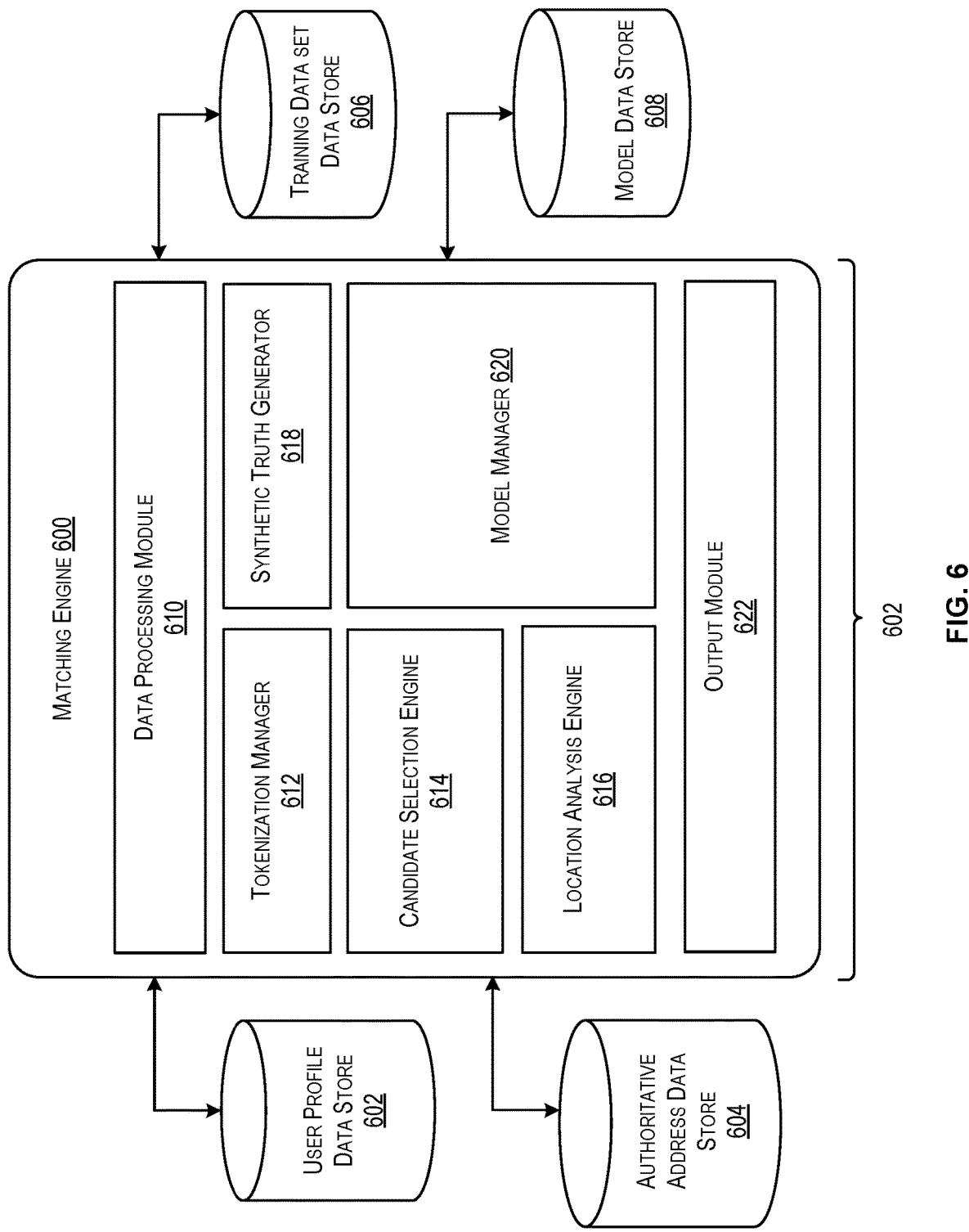
FIG. 6 illustrates an example computer architecture of a matching engine, in accordance with at least one embodiment.

FIG. 6 illustrates an example computer architecture of a matching engine 600 (an example of matching engine 544), including a plurality of modules that may perform functions in accordance with at least one embodiment. The modules 602 may be software modules, hardware modules, or a combination thereof. If the modules 602 are software modules, the modules 602 can be embodied on a computer readable medium and processed by a processor in any of the computer systems described herein. It should be noted that any module or data store described herein, may be, in some embodiments, be a service responsible for managing data of the type required to make corresponding calculations. The modules 602 may be exist as part of the matching engine 600 operating on the service provider computer(s) 510 of FIG. 5, or the modules may exist as separate modules or services external to the service provider computer(s) 510 (e.g., as part of the application 506 of FIG. 5 operating on the user devices 504 of FIG. 5).

In the embodiment shown in the FIG. 6, an user profile data store 602, an authoritative address data store 604, a training data set data store 606, and a model data store 610 are shown, although data can be maintained, derived, or otherwise accessed from various data stores, either remote or local to the matching engine 600, to achieve the functions described herein. In at least one embodiment, the data stores described herein may be physically located on the user device(s) 504 or alternatively, any suitable combination of the data stores may be operated as part of the service provider computer(s) 510, for example, as part of an matching engine 600. The interactive video engine 600, as shown in FIG. 6, includes various modules such as a data processing module 610, a tokenization manager 612, a candidate selection engine 614, a location analysis engine 616, a synthetic truth generator 618, a model manager 620, and an output manager 622. Some functions of the modules 610, 616, and 618 are described below. However, for the benefit of the reader, a brief, non-limiting description of each of the modules is provided in the following paragraphs. In accordance with at least one embodiment, a process is enabled for generating a training data set as described above in connection with FIGS. 1-3 that may then be utilized to train a machine-learning model such as the machine-learning model 400, an example of the machine-learning model 132 of FIG. 1.

In at least one embodiment, the matching engine 600 includes the data processing module 610. Generally, the data processing module 610 may be utilized to receive any suitable information with respect to any example provided herein. The data processing module 610 may include any suitable number of application programming interfaces with which the functionality of the matching engine 600 may be invoked.

In some embodiments, the data processing module 610 may be configured to receive user profile data. At any suitable, the data processing module 610 may store this data in user profile data store 602. In some embodiments, the user profile data may include any suitable data corresponding to one or more user profiles. This user profile data may include any suitable number of user-defined addresses. In some embodiments, at least one user-defined address may be associated with historical delivery data corresponding to one or more historical deliveries.

In some embodiments, the data processing module 610 may be utilized to receive a set of one or more authoritative addresses (e.g., from the authoritative source computer(s) 108 of FIG. 1). The data processing module 610 may be configured to store the set of authoritative addresses in authoritative address data store 604.

In some embodiments, the data processing module 610 may receive input requesting a model (e.g., machine-learning model 400) be trained. The request may identify a training data set stored within the training data set data store 606. This training data set may be generated utilizing one or more modules of the matching engine 600.

The functionality provided by the modules 602 may be utilized to identify and/or recommend a particular authoritative address as a match for a user-defined address provided as input.

The tokenization manager 612 may be configured to tokenize an address provided as input. By way of example, the tokenization manager 612 may be configured with code that, when executed, implements the tokenization algorithm described above in connection with FIG. 1. The tokenization manager 612 may be configured to output a set of tokens identified from an address (e.g., a user-defined address, an authoritative address) provided as input.

The candidate selection engine 614 may be configured to receive a set of query tokens from any suitable module of the modules 602. The candidate selection engine 614 may be configured to select a number of candidates from a set of authoritative addresses (e.g., the authoritative addresses of authoritative address data store 604, originally obtained from the authoritative source computer(s) 108 of FIG. 1). The candidate selection engine 614, may exercise any suitable operation described in connection with tables 202 and 204 of FIG. 2. By way of example, the candidate selection engine 614 may be configured to execute a scoring algorithm (e.g., Elasticsearch or another suitable algorithm) and assign scores (e.g., a common token score as described in connection with FIG. 2) that quantifies a number of common tokens between the query tokens and tokens corresponding to a candidate authoritative address. In some embodiments, the candidate selection engine 614 may implement code that, when executed, identifies a number corresponding to the number of tokens of a given candidate address. The candidate selection engine 614 may implement any suitable sorting algorithm such as the sorting algorithm described above in connection with FIG. 2, which can be utilized to sort a set of candidate authoritative addresses. The candidate selection engine 614 may implement any suitable protocol set for filtering and/or otherwise removing one or more candidates from the set as described in FIG. 2 in connection with set 206. The candidate selection engine 614 may be configured to invoke the functionality (e.g., via function call or otherwise) of location analysis engine 616.

The location analysis engine 616 may be invoked from any suitable module of the modules 602. In some embodiments, the location analysis engine 616 may be configured to perform any suitable operation described in connection with FIG. 3. By way of example, the location analysis engine 616 may take as input a user-defined address and one or more candidate addresses. The location analysis engine 616 may retrieve any suitable historical delivery data associated with the user-defined address from the user profile data store 602. The location analysis engine 616 execute any suitable operation discussed in connection with FIG. 3, to verify a candidate authoritative address as either being a match for the user-defined address or determine the candidate authoritative address is does not a match for the user-defined address. To make these verifications/determinations, the location analysis engine 616 may be configured to utilize one or more pre-defined distance thresholds as described in connection with FIG. 3. The location analysis engine 616 may label a candidate authoritative address as a match or not a match for a user-defined address, or the location analysis engine 616 may provide output indicating a particular authoritative address matches/does not match a particular user-defined address.

The synthetic truth generator 618 may be configured to invoke the functionality of the tokenization manager 612, the candidate selection engine 614, and the location analysis engine 616 as part of a process for generating one or more training data set examples. Once these examples are generated, the synthetic truth generator 618 may be configured to store the generated training data set in training data set data store 606.

The model manager 620 may be configured to train a machine-learning model (e.g., the machine-learning model 400 of FIG. 4) in the manner described above in connection with FIG. 4. The model manager 620 may retrieve the training data set from the training data set data store 606 and commence training the model using the retrieved data set. The model (and/or any suitable data corresponding to the model) may be stored in the model data store 608 for subsequent use.

Subsequently, a request to identify a match for a user-defined address may be received (e.g., by the data processing module 610). The functionality of the output manager 622 may be invoked to identify a matching authoritative address from the set of authoritative addresses stored in authoritative data store 604. In some embodiments, if the tokenization manager 612 has previously tokenized the authoritative addresses, the tokens determined from that tokenization may be stored as indices to each corresponding address as described in connection with FIG. 1. The output manager 622 may receive a user-defined address for which a match is to be identified. The output manager 622 may invoke the tokenization manager 612 to identify a set of tokens for the user-defined address. The output manager 622 may be configured to obtain the previously trained model and provide the set of tokens corresponding to the user-defined address and one of the authoritative addresses to identify a similarity score indicating a degree of similarity/dissimilarity between the user-defined address and the authoritative address provided as input to the model. This process may be repeated any suitable number of times (e.g., for each pair of addresses comprising the user-defined address and a different authoritative address of the set) until a similarity score has been generated for every authoritative address (or at least some number of authoritative addresses of the set stored in the authoritative address data store 604). The output module 622 may then select a particular authoritative address based on the similarity score. By way of example, the authoritative address corresponding to the highest similarity score may be selected as matching the user-defined address. In some embodiments, depending on the type of request received, the matched authoritative address may be provided as a recommendation (e.g., in response to the user typing in a user-defined address), while in other embodiments, a user profile that is associated with the user-defined address may be further associated with geographic data (e.g., a geocode) corresponding to the matched authoritative address. Any suitable operations (e.g., operations related to subsequent deliveries, etc.) may utilize the geocode now associated with the user-defined address as obtained from its association with the matched authoritative address.

Figure 7:
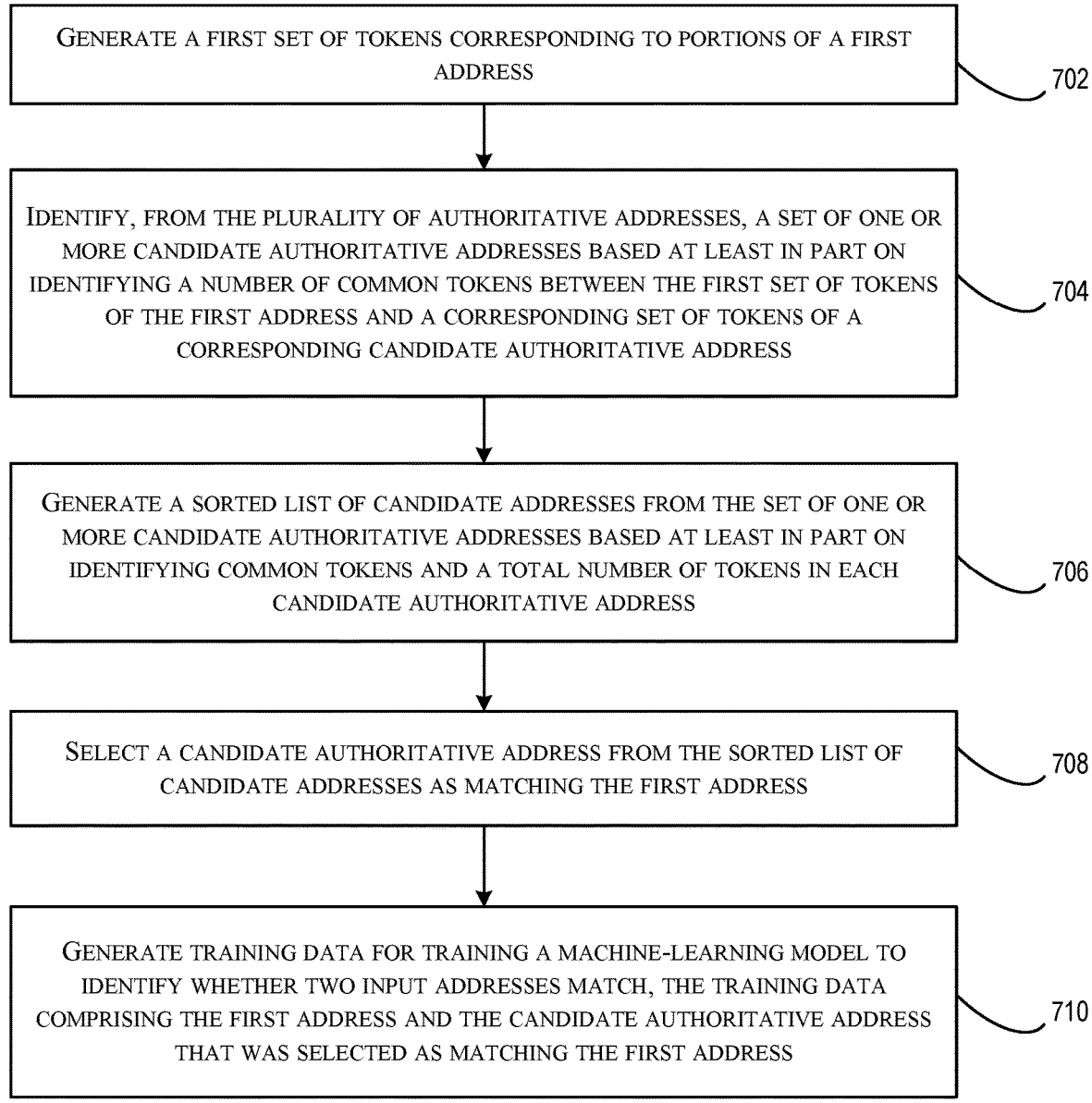
FIG. 7 is a flowchart illustrating an example method for generating a training data set for training a machine-learning model (e.g., the model 400 of FIG. 4), in accordance with at least one embodiment.

FIG. 7 is a flowchart illustrating an example method 700 evaluating logic at run time of a computer program using an interpreter, in accordance with at least one embodiment. The method 700 may be performed by a computing device. The computing device may include one or more processors, and one or more memories storing computer-executable instructions that, when executed with the one or more processors, cause the computing device to perform the operations of method 700.

The method 700 may begin at 702, where a first set of tokens corresponding to portions of a first address (e.g., a user-defined address such as user-defined address 112 of FIG. 1) may be generated (e.g., by the tokenization manager 612 of FIG. 6).

At 704, a set of one or more candidate authoritative addresses may be identified (e.g., by the candidate selection engine 614 of FIG. 6) from the plurality of authoritative addresses (e.g., a set of authoritative addresses provided by the authoritative source computer(s) 108 of FIG. 1 and stored in the authoritative address data store 604). In some embodiments, the set of one or more candidate authoritative addresses are identified based at least in part on identifying (e.g., by the candidate selection engine 614) a number of common tokens between the first set of tokens of the user-defined address and a corresponding set of tokens of a corresponding candidate authoritative address.

At 706, a sorted list of candidate addresses is generated (e.g., by the candidate selection engine 614) from the set of one or more candidate authoritative addresses based at least in part on identifying common tokens and a total number of tokens in each candidate authoritative address. Some examples operations for selecting and sorting the candidate addresses is discussed above in connection with FIG. 2.

At 708, a candidate authoritative address (CAA) is selected (e.g., by the candidate selection engine 614) from the sorted list of candidate addresses as matching the first address. In some embodiments, the selected CAA may be added (e.g., by the synthetic truth generator 618) to training data. In some embodiments, the synthetic truth generator 618 may be configured to label the selected CAA as being a match for the user-defined address or as not matching the user-defined address.

At 710, the training data for training a machine-learning model (e.g., the machine-learning model 400) may be generated (e.g., by the synthetic truth generator 618 utilizing any suitable combination of the functionality of the tokenization manager 612, the candidate selection engine 614, and/or the location analysis engine 616 of FIG. 6). In some embodiments, the training data comprises the first address (e.g., the user-defined address) and the candidate authoritative address that was selected as matching the first address.

Figure 8:
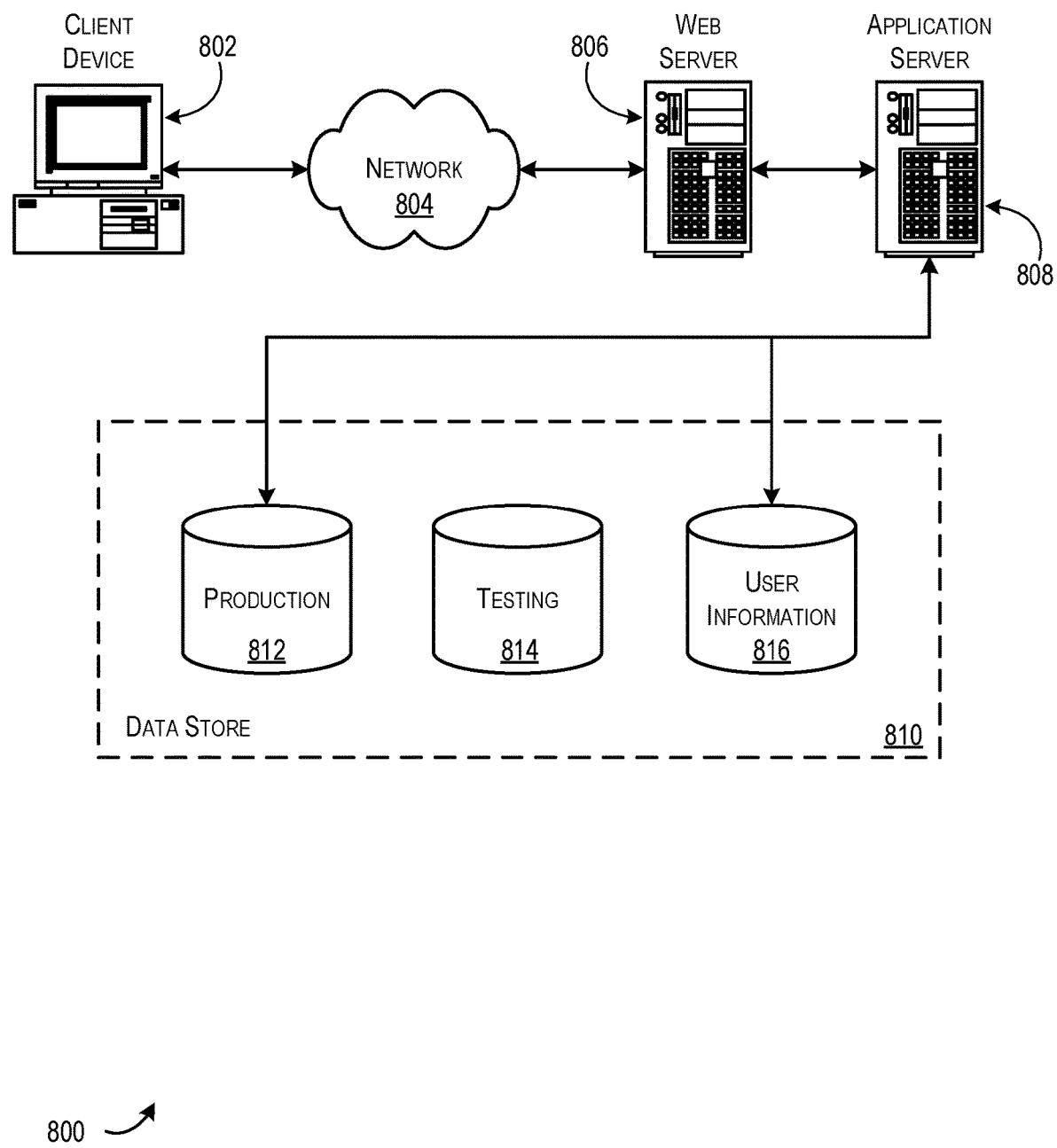
FIG. 8 is a schematic diagram illustrating an example environment for implementing aspects of the invention in accordance with at least one embodiment described herein.

FIG. 8 illustrates aspects of an example system 800 for implementing aspects in accordance with various embodiments. As will be appreciated, although a Web-based environment is used for purposes of explanation, different environments may be used, as appropriate, to implement various embodiments. The environment includes an electronic client device 802, which can include any appropriate device operable to send and receive requests, messages, or information over an appropriate network 804 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 806 for receiving requests and serving content in response thereto, although for other networks an alternative device serving a similar purpose could be used as would be apparent to one of ordinary skill in the art.

The illustrative environment includes at least one application server 808 and a data store 810. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio, and/or video to be transferred to the user, which may be served to the user by the Web server in the form of HyperText Markup Language ("HTML"), Extensible Markup Language ("XML"), or another appropriate structured language in this example. The handling of all requests and responses, as well as the delivery of content between the electronic client device 802 and the application server 808, can be handled by the Web server. It should be understood that the Web and application servers are not required and are merely example components, as structured code discussed herein can be executed on any appropriate device or host machine as discussed elsewhere herein.

The data store 810 can include several separate data tables, databases or other data storage mechanisms and media for storing data relating to a particular aspect. For example, the data store illustrated includes mechanisms for storing production data 812 and user information 816, which can be used to serve content for the production side. The data store also is shown to include a mechanism for storing log data 814, which can be used for reporting, analysis, or other such purposes. It should be understood that there can be many other aspects that may need to be stored in the data store, such as for page image information and to access right information, which can be stored in any of the above listed mechanisms as appropriate or in additional mechanisms in the data store 810. The data store 810 is operable, through logic associated therewith, to receive instructions from the application server 808 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the electronic client device 802. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 8. Thus, the depiction of the system 800 in FIG. 8 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS"), and AppleTalk®. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers, and business application servers. The server(s) also may be capable of executing programs or scripts in response to requests from user devices, such as by executing one or more Web applications that may be implemented as one or more scripts or programs written in any programming language, such as Java®, C, C#, or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired)), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
   obtaining a set of user-defined addresses;
   obtaining a plurality of authoritative addresses that are each associated with a corresponding geocode;
   generating a corresponding set of tokens for each of the plurality of authoritative addresses;
   indexing each authoritative address with the corresponding set of tokens;
   for each user-defined address:
   generating a first set of tokens corresponding to portions of a user-defined address;
   identifying, from the plurality of authoritative addresses, a set of candidate authoritative addresses that are similar to the user-defined address based at least in part on 1) identifying a total number of tokens of a second set of tokens generated from a respective candidate authoritative address, and 2) identifying a quantity of common tokens that are individually included in both the first set of tokens corresponding to the user-defined address and the second set of tokens generated from the respective candidate authoritative address;
   generating a sorted list of candidate addresses from the set of candidate authoritative addresses based at least in part on the quantity of common tokens and the total number of tokens generated from the respective candidate authoritative address; and
   identifying one candidate authoritative address from the sorted list of candidate addresses as matching the user-defined address;
   generating training data comprising a plurality of training data examples, a training data example comprising the user-defined address, the candidate authoritative address that was identified as matching the user-defined address, and a label that indicates that the user-defined address matches the candidate authoritative address; and
   training a machine-learning model with the training data to identify whether two input addresses match.

2. The computer-implemented method of claim 1, further comprising selecting the candidate authoritative address from the sorted list of candidate addresses based at least in part on the candidate authoritative address being in a first position of the sorted list of candidate addresses.

3. The computer-implemented method of claim 1, wherein the training data further comprises at least one other candidate address from the sorted list of candidate addresses, the at least one other candidate address being different from the candidate authoritative address that was identified as matching the user-defined address.

4. The computer-implemented method of claim 1, wherein generating the first set of tokens comprises identifying sequential groupings of alphabetic characters and a sequential grouping of numeric characters, wherein a first token comprises the sequential grouping of alphabetic characters, and wherein a second token comprises the sequential grouping of numeric characters.

5. The computer-implemented method of claim 1, further comprising generating a score for the candidate authoritative address, the score being generated based at least in part on the quantity of common tokens that are individually included in both the first set of tokens corresponding to the user-defined address and the second set of tokens generated from the respective candidate authoritative address.

6. The computer-implemented method of claim 5, wherein the score is generated for the candidate authoritative address based at least in part on executing a searching algorithm that utilizes a constant scoring function, the searching algorithm being executed with a query comprising the user-defined address, the searching algorithm being executed against the plurality of authoritative addresses.

7. The computer-implemented method of claim 6, wherein the constant scoring function is configured to generate corresponding scores for each of the plurality of authoritative addresses, the corresponding scores being generated based at least in part on the quantity of common tokens that are individually included in both the first set of tokens corresponding to the user-defined address and a particular set of tokens corresponding to a particular authoritative address of the plurality of authoritative addresses, the searching algorithm being configured to return the set of candidate authoritative addresses based at least in part on the corresponding scores.

8. A computing device, comprising:
one or more processors; and
one or more memories storing computer-executable instructions that, when executed with the one or more processors, causes the computing device to:
obtain a user-defined address;
obtain a plurality of authoritative addresses;
generate a first set of tokens corresponding to portions of the user-defined address;
identifying, from the plurality of authoritative addresses, a set of one or more candidate authoritative addresses, based at least in part on identifying a quantity of common tokens that are individually included in both the first set of tokens of the user-defined address and a second set of tokens generated from a corresponding candidate authoritative address of the plurality of authoritative addresses;
generate a sorted list of candidate addresses from the set of one or more candidate authoritative addresses based at least in part on the quantity of common tokens and a total number of tokens the second set of tokens generated from the corresponding candidate authoritative address;
select a candidate authoritative address from the sorted list of candidate addresses as matching the user-defined address based on at least in part on the quantity of common tokens and the total number of tokens of the second set of tokens; and
generate training data for training a machine-learning model, the training data being generated to include a training data example comprising the user-defined address, the candidate authoritative address that was selected as matching the user-defined address, and a label that indicates that the candidate authoritative address matches the user-defined address.

9. The computing device of claim 8, wherein the training data set further comprises an additional training example comprising one other candidate authoritative address from the set of one or more candidate authoritative addresses and an indication that the one other candidate authoritative address does not match the user-defined address.

10. The computing device of claim 8, wherein the user-defined address is associated with one or more historical deliveries, and wherein at least one candidate authoritative address is identified for the set of one or more candidate authoritative addresses based at least in part on the one or more historical deliveries.

11. The computing device of claim 10, wherein executing the instructions further cause the computing device to:
identify first geographical coordinates associated with at least one historical delivery;
identify second geographical coordinates of a particular candidate authoritative address; and
calculate a distance between a first location corresponding to the first geographical coordinates and a second location corresponding to the second geographical coordinates, wherein the respective candidate authoritative address is identified as not matching the user-defined address when the distance is greater than a predefined distance threshold.

12. The computing device of claim 8, wherein executing the instructions further cause the computing device to obtain the machine-learning model trained to identify whether two addresses match, the machine-learning model being trained utilizing the training data and an unsupervised learning algorithm.

13. The computing device of claim 12, wherein the machine-learning model is Siamese neural network.

14. A non-transitory computer readable medium comprising one or more memories storing computer-executable instructions that, when executed by one or more processors of a computing device, cause the computing device to:
identify a first set of tokens of a first address, the first set of tokens comprising a first token corresponding to a group of sequential alphabetic characters of the first address, and a second token corresponding to a group of sequential numeric characters of the first address;
identify a respective set of tokens for each authoritative address of a plurality of authoritative addresses obtained from an address authority, the respective set of tokens comprising a third token corresponding to a first group of sequential alphabetic characters of a respective authoritative address, and a fourth token corresponding to a second group of sequential numeric characters of the respective authoritative address;
calculate a quantity of common tokens that are included in both the first set of tokens and the respective set of tokens;
select a subset of authoritative addresses from the plurality of authoritative addresses based at least in part on the quantity of common tokens and a total number of tokens in the respective set of tokens, the subset of authoritative addresses being selected to comprise a particular authoritative address that is identified as a best match for the first address and a set of remaining addresses of the subset that are identified as not matching the first address; and
generate training data from the subset of authoritative addresses, the training data being generated to comprise a training data example comprising the first address, the particular authoritative address, and a label that indicates that the first address and the particular authoritative address match, the training data being configured to be used with a supervised learning algorithm to train a machine-learning model to determine whether when two input addresses match.

15. The non-transitory computer readable medium of claim 14, wherein executing the instructions further causes the computing device to:
receive the first address, the first address being defined by a user;
select a second address from a set of authoritative addresses;
generate a first feature set for the first address;
generate a second feature set for the second address; and
provide the first feature set generated from the first address and the second feature set generated from the second address to the machine-learning model as input.

16. The non-transitory computer readable medium of claim 15, wherein the first feature set for the first address comprises a token feature for each of the first set of tokens of the first address.

17. The non-transitory computer readable medium of claim 16, wherein the token feature for a given token comprises a concatenation of a token embedding, a token length embedding, a token type one hot encoding, and a token case one hot encoding.

18. The non-transitory computer readable medium of claim 15, wherein generating the first feature set comprises providing each token of the first set of tokens as input to a convolutional neural network.

19. The non-transitory computer readable medium of claim 14, wherein executing the instructions further causes the computing device to:
provide, to the machine-learning model as input, a first feature set corresponding to a user-defined address and a second feature set corresponding to an authoritative address;
receive, from the machine-learning model, a probability value indicating a likelihood that the user-defined address matches the authoritative address; and
when the probability value is greater than a predefined threshold value, associate the user-defined address with a geocode associated with the authoritative address.

20. The non-transitory computer readable medium of claim 14, wherein the first address is associated with a user account managed by a service provider of an online retail website.

* * * * *